(No Model.)
E. J. HOUSTON & A. E. KENNELLY.
ELECTRICAL MEASURING INSTRUMENT.
No. 579,344.　　　　　　　　　　Patented Mar. 23, 1897.
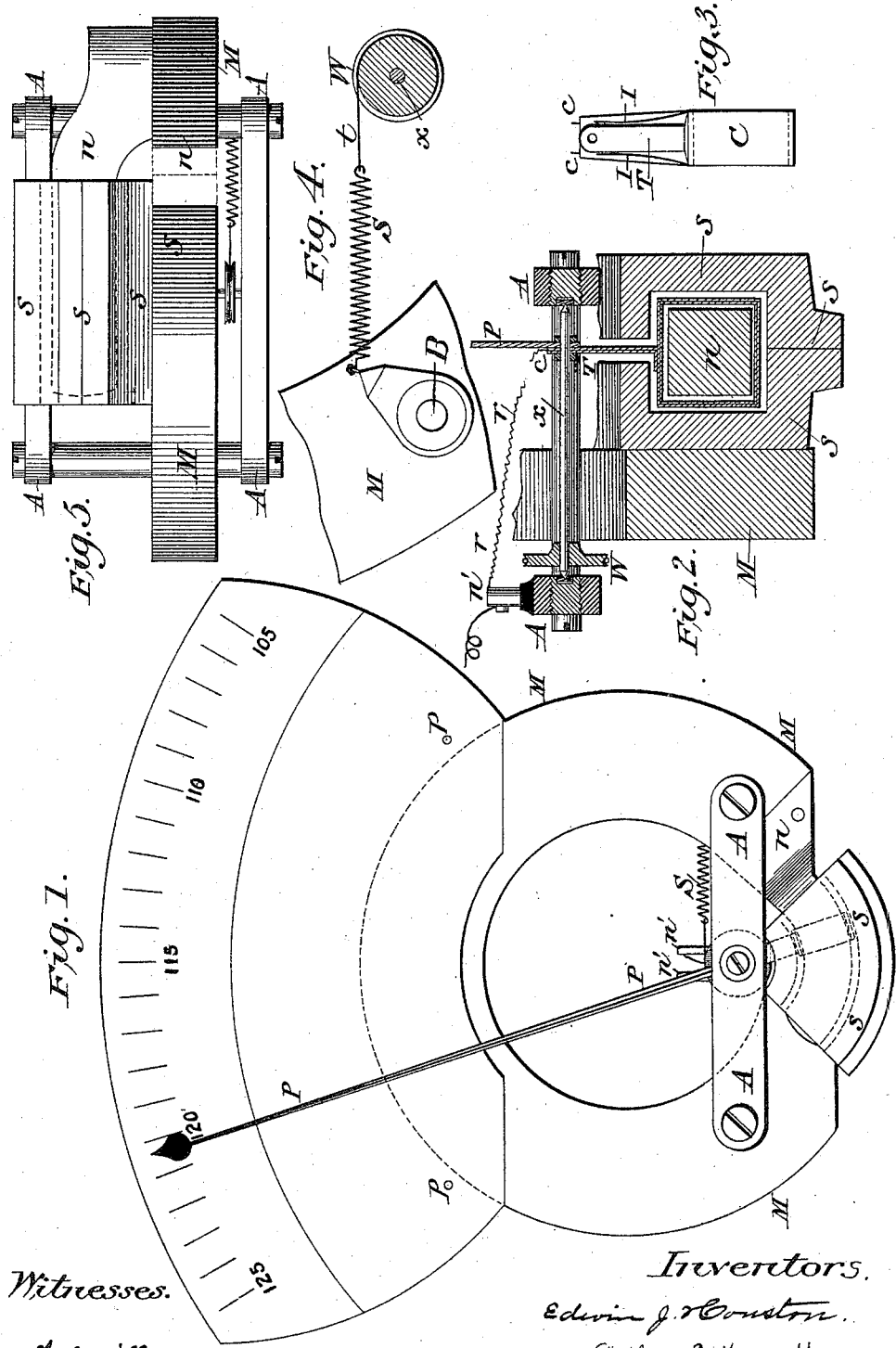
Witnesses.
W. A. Millet
Samuel L. Taylor
Inventors.
Edwin J. Houston.
Arthur E. Kennelly.

UNITED STATES PATENT OFFICE.

EDWIN JAMES HOUSTON AND ARTHUR E. KENNELLY, OF PHILADELPHIA, PENNSYLVANIA.

ELECTRICAL MEASURING INSTRUMENT.

SPECIFICATION forming part of Letters Patent No. 579,344, dated March 23, 1897.

Application filed October 27, 1896. Serial No. 610,203. (No model.)

*To all whom it may concern:*

Be it known that we, EDWIN JAMES HOUSTON and ARTHUR EDWIN KENNELLY, of the city and county of Philadelphia, State of Pennsylvania, have invented certain new and useful Improvements in Electrical Measuring Instruments, of which the following is such a description as will enable one skilled in the art appertaining thereto to make and use the same, reference being had to the accompanying specification and drawings and the figures of reference marked thereon.

Our invention relates to improvements in that class of electric measuring instruments in which the current passing through a movable coil is measured by the electromagnetic force set up between the coil and the magnetic flux produced by a fixed permanent magnet. As heretofore constructed, instruments of this type are subject, in a greater or less degree, to disturbances from external magnetic fields, such as those due to electric currents or magnets in the neighborhood. Briefly, the object of our invention is to reduce this disturbance to a minimum without the use of any independent external magnetic shield, such as an iron case surrounding the instrument. We effect this by making the pole-pieces of the permanent magnet almost completely shield and inclose the movable coil, so that the latter moves in what is practically an iron-clad space. At the same time we do this without necessitating the dismantling of the pole-pieces for the introduction or removal of the coil.

Figure 1 shows a front view of the working parts of our measuring instrument. Fig. 2 is a cross-section of the instrument in a plane containing the pointer and axis. Fig. 3 is a detail view of the movable coil, and Fig. 4 is a view of the retractile spring which opposes the electromagnetic force.

In Fig. 1, M M M M is a permanent magnet of hard steel provided with two pole-pieces $n$ and $s$, permanently attached thereto. These are preferably made of soft iron. Their extremities are so shaped that when secured in position to the magnet M M they provide an inclosed annular channel of uniform width in which the movable coil may swing. The annular channel or air-gap is necessarily sectorial to the axis of the movable coil, as shown by the dotted lines in Fig. 1. In Fig. 2 it is represented as being of square form in cross-section, but it is evident that the principles of our invention will be embodied in a coil which is rectilinear, circular, or of any convenient shape, provided that the two pole-pieces are conformable with each other and maintain a uniform air-gap between them in which the coil is free to move. The channel so provided is completely inclosed by the soft iron of the external pole-piece $s$, except at the slot in which the support T of the coil plays to and fro. The pole-pieces are firmly screwed to their respective magnet-poles, so that they shall be maintained at the proper distance apart despite their magnetic attraction. This annular arrangement of sectorial magnetic poles insures a very nearly uniform magnetic flux in the intervening air-space.

The coil C may be threaded into its position within the instrument over the extremity Y of the inner pole-piece $n$ at any time after the pole-pieces have been permanently attached to the magnet, and in a similar manner the coil C may be withdrawn from the instrument without disengaging the pole-pieces and thereby interfering with the magnetic circuit. This constitutes a feature of our invention and is a matter of considerable practical importance. In most instruments of the permanent-magnet type the coil which is acted upon can only be placed in position by actually removing one or both of the pole-pieces, an operation which disrupts the magnetic circuit and is likely to be attended by a permanent change in its magnetic condition. In our instrument this difficulty is avoided, since, as we have pointed out, the coil can be introduced into or removed from the polar channel without disturbing the pole-pieces.

The permanent magnets of our instruments may therefore have their pole-pieces permanently attached, be magnetized, and then subjected to any process of magnetic aging, such as immersing in hot oil or jarring or remaining at rest, long before the coils are inserted and the instrument completed. This enables the magnetic circuit to acquire a stable condition before the instrument is calibrated.

Fig. 5 is an end view of the magnet and pole-pieces from the lower end, showing the method of attaching the pole-pieces to the magnet.

Figs. 2 and 3 show the arrangement of the coil, which is here represented as being rectangular in form in order to conform to the rectangular polar channel. The coil is wound of fine insulated wire in the usual manner. It may be wound upon a light frame of mica, fiber, or other suitable material. In order to render the instrument dead-beat, the frame may be composed of copper according to the manner long known in the art, or special turns on the frame, which may or may not form part of the winding, may be short-circuited upon themselves, or the coil itself may be surrounded by a conducting-case, the electric currents set up by the motion of the coil tending in all these cases to oppose and damp its motion. The terminals of the coil are led to the points c c, supported upon a mica or fiber sheet I I. These points c c are soldered to the extremities of fine conducting-wires r r, which enable the current to be measured to pass into and out of the coil. These wires may be fine spirals or flat strips or uncoiled wires, the object being to provide conductors to reach the coil and at the same time to impose as little opposition as possible to the free motion of the coil. The sole function of these wires is therefore merely to convey the current.

The ends of the wires r r are soldered to insulated pins or supports n' n', which form, therefore, the main terminals of the movable coil.

When an electric current passes between the terminals n' n' through the coil, an electromagnetic force parallel to the walls of the polar channel is brought to bear upon all portions of the wire forming the coil, the direction of the force depending upon the direction of the current. This force sets up a couple about the axis x x of the movable system, the magnitude of which is directly proportional to the current strength, provided, of course, that this is feeble. The movement of the coil under the influence of this force is indicated on the scale by the pointer P P, which in this case plays between the stops p p. The torque which opposes the motion is shown in Fig. 4 to be due to the extension of the spiral spring S, one end of which is shown as soldered to a clip securely clamped under the pillar B, which supports the arm A, while the other end of the spring terminates in a hook threaded through a loop on the end of the fine wire t, of thread or metal, passing over a groove on the circumference of a pulley W, rigidly secured to the axis x. By this means the instrument can be made to start from its position of rest under a considerable normal spring tension and opposing couple, so that when used as a voltmeter, with a scale such as that shown in Fig. 1, the coil will not start until a pressure of about one hundred and six volts is applied at the main terminals of the instrument through a resistance of, say, ten thousand ohms of platinoid wire. Since every part of the coil contributes to produce an electromagnetic force, the torque of the system is relatively powerful. The pulley W is represented as being an ordinary wheel, but it may be an eccentric or a cam of any desired curvature in order to obtain any desired scale. The opposing couple may also be formed by a weight suspended over a curved pulley, or by one or more springs, or by a coil-spring, or by any other well-known substitute.

The instrument may be employed either as an ammeter or a voltmeter by suitable connection and calibration with external resistances.

The inclosure of the movable coil within the external pole-pieces affords a very nearly complete magnetic protection of the coil from any stray magnetic fields due to neighboring currents or magnets, and this we consider an essential feature of our invention.

Our invention therefore consists, essentially, in the form and arrangement of the magnet and pole-pieces forming the magnetic circuit of a measuring instrument of the electromagnetic type, in which the pole-pieces provide an annular space for the movement of the coil, practically surrounded by iron, and from which the coil may be removed without disturbing the pole-pieces.

What we claim as our invention, and desire to secure by Letters Patent, is the following, namely:

1. In an electrical measuring instrument, the combination of a permanent magnet provided with pole-pieces one of which incloses the other, so as to leave between them a polar channel, sectorial, in the direction of its length, about a fixed axis, so arranged that a coil capable of moving about the said fixed axis, for measuring current strength, may be introduced into or removed from the polar channel without disturbing the distribution of magnetic flux in the channel.

2. In an electrical measuring instrument, the combination of a permanent magnet provided with pole-pieces one of which incloses the other, so as to leave between them a polar channel, sectorial, in the direction of its length, about a fixed axis; a coil capable of moving in the polar channel about the said fixed axis into positions corresponding to definite and definitely-indicated current strengths under the action of electromagnetic forces and a definite opposing torque or couple.

3. In an electrical measuring instrument, the combination of a permanent magnet provided with pole-pieces one of which incloses the other, so as to leave between them a polar channel sectorial, in the direction of its length, about a fixed axis; a coil capable of moving in the polar channel about a fixed axis into positions corresponding to definite current strengths under the action of electromagnetic forces opposed by a definite torque or couple, and a pointer rigidly attached to said coil and moving over an indicating-scale.

4. In an electrical measuring instrument the combination of a permanent magnet provided with pole-pieces one of which incloses the other so as to leave between them a polar channel sectorial, in the direction of its length, about a fixed axis; a coil capable of motion in the polar channel about the said fixed axis, capable of insertion or removal without disturbing the distribution of magnetic flux in the polar channel, and moving into positions corresponding to definite and definitely-indicated current strengths under the action of electromagnetic forces opposed by a definite torque or couple, substantially as described.

EDWIN JAMES HOUSTON.
ARTHUR E. KENNELLY.

Witnesses:
WILLIAM DOWNS ANDERSON,
WILLIAM A. MILLET.